United States Patent
Mullins

[11] 3,752,185
[45] Aug. 14, 1973

[54] REFRIGERANT SIGHT GLASS
[76] Inventor: John W. Mullins, P. O. Box 20524, Oklahoma City, Okla. 73120
[22] Filed: Nov. 10, 1971
[21] Appl. No.: 197,240

[52] U.S. Cl.............. 137/559, 62/125, 116/117 C, 137/318
[51] Int. Cl. ...................... F16k 43/00, G01f 15/06
[58] Field of Search.............................. 73/323, 73; 116/117 R, 117 C; 62/125, 294; 137/559, 318

[56] References Cited
UNITED STATES PATENTS

| | | | |
|---|---|---|---|
| 3,225,555 | 12/1965 | Chatlos | 62/125 X |
| 1,846,792 | 2/1932 | Carroll et al | 73/368.4 X |
| 3,142,287 | 7/1964 | Jones | 73/73 X |
| 3,544,276 | 12/1970 | Merwitz, Sr. | 62/125 |
| 2,536,001 | 12/1950 | Chase | 62/294 X |

Primary Examiner—Richard C. Queisser
Assistant Examiner—Daniel M. Yasich
Attorney—Robert K. Rhea

[57] ABSTRACT

A generally cylindrical centrally bored housing is coaxially secured at one end portion within a short length of copper tubing. The other end of the copper tubing is contoured for connection with a fluid containing line. A tubular core, having a transparent disk closing its bore adjacent one end portion and a line piercing tip formed on its other end portion and having an overall length slightly less than the combined length of the housing and copper tubing, is coaxially received by the bore of the housing. A cap, removably engaged threadedly with the free end of the housing, forces the line piercing tip into the line and seals the core with the housing and the line.

3 Claims, 3 Drawing Figures

Patented Aug. 14, 1973

3,752,185

REFRIGERANT SIGHT GLASS

CROSS REFERENCE TO RELATED APPLICATION

The present invention is an improvement over my copending application Ser. No. 137,376 filed Apr. 26, 1971 for Copper Tubing Service Valve.

BACKGROUND OF THE INVENTION

1. Field of the Invention

The present invention relates to refrigerant lines and more particularly to a refrigerant line tapping sight glass.

In order to maintain a refrigerant system operable it is necessary that the refrigerant gas containing lines be maintained full of the refrigerant gas. An insufficient quantity of gas contained by the refrigerant lines may occur as the result of a leak in the system or an insufficient evacuation of the lines after performing repairs to the system and recharging the lines. An insufficient quantity of gas within the refrigerant lines results in malfunction or at least insufficient cooling characteristics, therefore, it is necessary that some means be provided for determining whether or not the refrigerant lines are full of refrigerant gas during operation of the system.

This invention is distinctive over my above referred to application by providing a sight glass within the bore of a line piercing core communicating with a refrigerant line to provide visual indication of the quantity of refrigerant gas contained by the line.

2. Description of the Prior Art

Sight glasses conventionally used in refrigerant systems generally comprise an elongated fitting having threads at its respective ends permitting the fitting to be interposed between adjacent ends of a refrigerant line and connected for communication therewith. The fitting is provided with a lateral opening closed by a transparent member for visual indication of the quantity of gas contained by the line. This type of sight glass is generally satisfactory when installed during assembly of the refrigerating components, however, many refrigerating systems presently in use are not equipped with a sight glass. When installing a sight glass of the above conventional type it is necessary to remove or bleed off the refrigerant gas in order to part a line and install the sight glass therein, thus necessitating recharging the system after installing the sight glass.

This invention provides a housing and means for its connection with a refrigerant line, intermediate the line ends including a sight glass equipped core for piercing the line and sealing therewith thus eliminating any disassembly or loss of the refrigerant gas and effecting a saving of materials and time.

SUMMARY OF THE INVENTION

A generally cylindrical centrally bored housing having external threads at one end portion is coaxially connected at its other end portion with one end portion of a relatively short length of copper tubing.

The other end of the copper tubing is contoured to form an arcuate recess complemental with the radius of a line to be tapped and partially surrounds a wall portion of the line for connecting the copper tubing to the line, as by soldering. A cylindrical core, having a line piercing tip at one end portion and an overall length slightly greater than the spacing between the free end of the housing and the inner surface of the wall of the line to be tapped, when connected with the copper tubing, is coaxially received by the housing. The end of the core, opposite its line piercing tip, receives a disk-like section of transparent material in sealing relation. The core is moved longitudinally into the housing by a cap threadedly engaged with the housing which forces the line piercing tip through the wall of the line to seal therewith and crimps a thin wall free end portion of the housing inwardly in overlapping, locking and sealing relation against the adjacent outer wall surface of the core.

The principal object of this invention is to provide a sight glass equipped fitting which may be easily connected for communication with the bore of a refrigerant gas conducting line intermediate its ends.

DESCRIPTION OF THE PREFERRED EMBODIMENT

Figure 1:
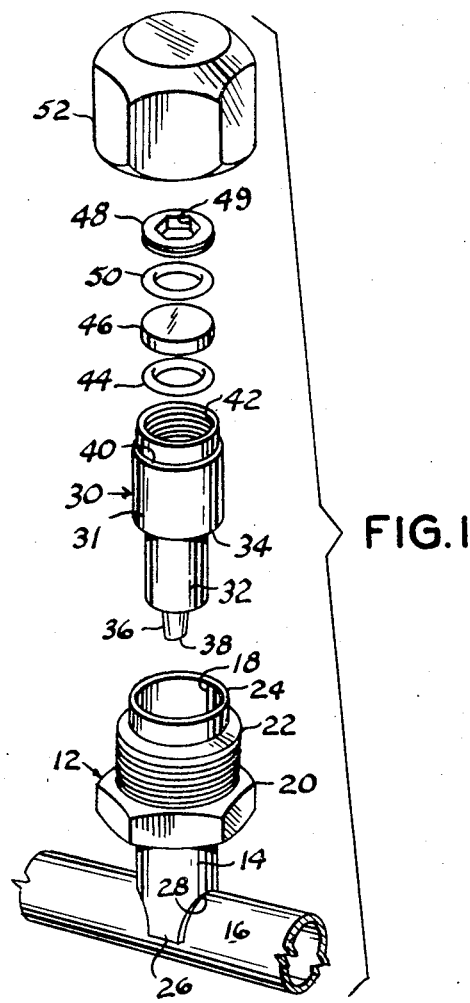
FIG. 1 is an exploded perspective view of the sight glass components and a fragment of a refrigerant line.

Like characters of reference designate like parts in those figures of the drawings in which they occur.

In the drawings:

The reference numeral 10 indicates the device, as a whole, comprising a housing 12 secured to a connector 14 in turn mounted on a line 16 to be tapped. The housing 12 is generally cylindrical having a bore 17, and a counterbore 18, forming an annular shoulder 19. The housing has a hexagonal head 20 forming wrench flats intermediate its ends. One end portion of the housing is externally threaded, as at 22. This end portion of the housing is characterized by a reduced periphery forming a relatively thin wall 24 extending coaxially outward from the threads 22 for the purposes presently explained.

The other end portion of the housing, opposite the threads 22, is diametrically reduced and is coaxially received within one end portion of the tubular connector 14 and is secured thereto, as by brazing, to form a gas and fluid tight joint. The connector 14 is preferably formed of the same material and wall thickness as the line 16 to be tapped.

As mentioned hereinabove the line 16 usually comprises a length of copper tubing and in this event the connector 14 is similarly formed from a length of copper tubing usually diametrically slightly greater than the outside diameter of the line 16 for the purposes presently apparent.

The other end portion of the connector 14, opposite the housing connected end, is bifurcated by forming a transverse substantially U-shaped recess or slot through its wall end portion defining opposing connector legs 26 and an arcuate bight portion or surface 28 for contacting a peripheral portion of the line 16. The length of the legs 26, when straddling the line 26, is preferably such that their free end surface projects beyond a diametric line taken through the line 16 normal to the axis of the housing bore thus permitting the free end portion of the legs to be bent or crimped inwardly toward each other in line contacting relation in a partial wrap around action on the line 16 thus temporarily positioning the connector 14 on the line. The connector 14 is then secured to the line, as by soldering, which is easily accomplished for the reason that the connector 14 and line 16, being formed of the same material and substantially the same wall thickness, are easily heated to a soldering temperature.

A step diametered tubular core 30, preferably formed of case hardened metallic material, is coaxially received by the housing. One end portion 31 of the core is longitudinally and diametrically substantially equal with the housing counterbore 18. The other end portion of the core is diametrically reduced, as at 32, for entering the housing bore 17 and forming an annular shoulder 34 for engaging the housing shoulder 19. The free end of the core end portion 32 is integrally connected coaxially with a dimetrically reduced centrally bored line piercing tip 36 coverging toward its free end and having a beveled end surface 38 for enhancing its line piercing characteristics. The overall length of the core, and including its tip 36, is slightly greater than the spacing between the free end of the housing wall 24 and adjacent surface of the line 16 so that the core may be substantially completely enclosed by the housing with its cutting tip entering the line 16 in the manner presently explained.

The periphery of the free end portion of the core opposite the tip 36 is diametrically reduced to form an annular shoulder 40. The core is counterbored and threaded, as at 42, from its end opposite the tip 36 and is provided, at the inward limit of the threads 42, with an annular, part circular in cross section, recess for receiving a first seal such as an O-ring 44.

A cylindrical or disk-like member 46, formed of transparent material, is coaxially received by the threaded bore of the core and seats in sealing relation against the first O-ring 44.

A centrally bored externally threaded ring or plate 48 is threadedly engaged with the core threads 42 outwardly of the disk 46. The plate 48 is provided with means to facilitate its insertion and removal such as by broaching its central aperture to form a hexagonal opening 49 for receiving a conventional set screw wrench, not shown. A second seal or O-ring 50 is interposed between the disk 46 and plate 48 to insure sealing the disk 46 with the wall forming the bore of the core.

An internally threaded cap 52 threadedly engages the housing threads 22 and forces the core 30 toward and into the line 16. The cap 52 is characterized by a converging wall surface 54 defining its inner closed end, inwardly of its threads, wherein this surface 54 forces the housing thin wall end 24 toward and against the circumferentially reduced end portion of the core 30 outwardly of its shoulder 40 in a crimping and sealing action of the wall 24 for holding the core in place.

OPERATION

In operation the housing 12 is connected with the connector 14, as described hereinabove, at the time of manufacture. The glass equipped core 30 and cap 52 are supplied to the refrigerant service personnel with the assembled housing 12 and connector 14. The serviceman places the connector 14 in straddling relation upon the line 16 to be tapped and makes a soldered connection as described hereinabove.

It should be noted that this soldered connection between the connector 14 and line 16 need not necessarily be fluid tight for the reasons presently explained, however, the soldered joint between the connector 14 and line 16 must be sufficiently strong to permit withstanding the line piercing action as described hereinbelow.

The core 30, having the glass or disk 46 installed therein, is longitudinally inserted into the housing with the core tip 36 disposed toward the surface of the line 16. The cap 52 is then manually engaged threadedly with the housing threads 22. A pair of suitable wrenches, not shown, are placed respectively, on the housing head 20 and periphery of the cap 52 for continuing the threaded engagement of the cap 52 with the housing wherein, as the cap is progressively moved toward the housing head 20, the beveled inner surface 54 of the cap, contacting the wall end surface at the threaded end portion of the core, progressively forces its tip 36 through the wall of the line 16 in a piercing and sealing action. When the wall of the threaded end of the core is substantially coextensive with the housing wall 24 the beveled inner surface 54 of the cap simultaneously contacts the free end portion of the housing wall 24 and forces it inwardly in crimping and sealing relation with respect to the reduced end portion of the core wall outwardly of its annular shoulder 40. Since the material forming the core 30 is preferably formed of relatively hard material, such as steel, its tip 36 forms a gas and liquid tight seal where it pierces the wall of the line 16 and further the thin wall 24 of the housing forms a secondary seal around the periphery of the core at its threaded end. Axial movement of the core 30 into the housing is limited by the core shoulder 34 contacting the housing shoulder 19. The bore of the core 30 is now in communication with the bore of the line 16. Any air trapped in the line 16 and collecting within the bore of the core 30 may be released by unscrewing the plate 48 a thread or two so that the impinging sealing action of the O-rings 44 and 50 with the disk 46 is released thus releasing the trapped air. The plate 48 is then retightened to seal the bore of the core.

Figure 2:
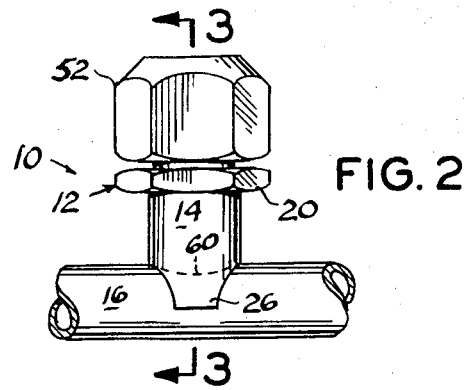
FIG. 2 is a side elevational view of the device when installed on a refrigerant line; and, FIG. 3 is a vertical cross-sectional view taken substantially along the line 3—3 of FIG. 2.
Figure 3:
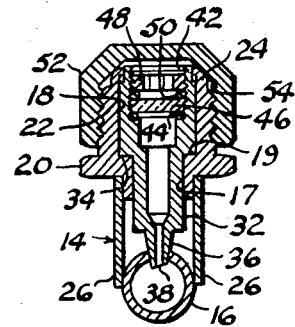

Obviously the connector 14 may connect the sight glass to a line diametrically equal with or greater than the diameter of the connector. In this event the end of the connector opposite the housing is simply recessed or contoured to form an arcuate surface complemental with the outside radius of the line to be tapped and terminating toward opposing side surfaces of the line in an arcuate curve, as indicated by the dotted line 60 (FIG. 2).

Obviously the invention is susceptible to changes or alterations without defeating its practicability, therefore, I do not wish to be confined to the preferred embodiment shown in the drawings and described herein.

I claim:
1. A sight glass for a tubular line, comprising:
a generally cylindrical centrally bored housing having a diametrically reduced periphery at one end portion forming a relatively thin wall,
said housing having external threads intermediate its ends;
a tubular member coaxially secured, at one end portion, to the end portion of said housing opposite said thin wall, the other end portion of said tubular member being transversely recessed to define an arcuate surface formed on a radius complemental with the outside radius of the tubular line to be tapped, said tubular member having a wall thickness substantially equal with respect to the wall thickness of the tubular line to be tapped;

a tubular core, having a length slightly greater than the spacing between the end of said thin wall portion of said housing and the periphery of the tubular line nested by the arcuate surface, coaxially received by the central bore of the housing, said core having a diametrically reduced tapered end portion converging toward the tubular line to be tapped, said tapered end portion terminating in a beveled end surface forming the line piercing tip, said core having a diametrically reduced peripheral portion adjacent its end opposite said line piercing tip forming an annular shoulder adjacent the housing thin wall portion;

a transparent disk transversely intersecting the bore of said core in its end portion opposite said line piercing tip;

ring means sealing said transparent disk with the inner wall surface of said core; and, a cap engaging the external threads on said housing, said cap having a beveled inner end surface for contacting the adjacent outwardly disposed end surface of said core and forcing the line piercing tip of said core into the tubular line to be tapped and subsequently contacting the outer end surface of said housing thin wall portion and forcing the latter inwardly against the outer surface of said core outwardly of said annular core shoulder in locking relation as said cap in progressively engaged threadedly with said housing.

2. The sight glass according to claim 1 in which the end portion of said core opposite said line piercing tip is internally threaded and provided with an annular shoulder adjacent the inward limit of the threads and said sealing means includes:

a centrally apertured plate threadedly received by the core and forcing said transparent disk toward said inner shoulder; and, a resilient seal interposed between said transparent disk and said inner shoulder.

3. The sight glass according to claim 2 in which the wall forming the bore of said housing is provided with an annular shoulder facing toward said housing thin wall and said core is provided with an outer annular shoulder facing toward said line piercing tip for engaging the housing shoulder and limiting the depth of penetration of said line piercing tip into the line secured to said tubular member.

* * * * *